(12) United States Patent
Chatterjee

(10) Patent No.: US 9,395,827 B2
(45) Date of Patent: Jul. 19, 2016

(54) SYSTEM FOR DETECTING ORIENTATION OF MAGNETICALLY COUPLED DEVICES

(75) Inventor: Manjirnath Chatterjee, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1466 days.

(21) Appl. No.: 12/840,241

(22) Filed: Jul. 20, 2010

(65) Prior Publication Data

US 2011/0022350 A1 Jan. 27, 2011

Related U.S. Application Data

(60) Provisional application No. 61/227,418, filed on Jul. 21, 2009.

(51) Int. Cl.
*G06F 3/0362* (2013.01)
*G06F 3/0346* (2013.01)

(52) U.S. Cl.
CPC ............ *G06F 3/0362* (2013.01); *G06F 3/0346* (2013.01); *G06F 2200/1614* (2013.01)

(58) Field of Classification Search
CPC ............... G06F 3/0346; G06F 3/0362; G06F 2200/1614
USPC .................................. 702/150, 151, 152, 153
See application file for complete search history.

(56) References Cited

U.S. PATENT DOCUMENTS

| 4,940,966 | A | * | 7/1990 | Pettigrew et al. ............. 340/551 |
|---|---|---|---|---|
| 5,375,226 | A | | 12/1994 | Sano et al. |
| 5,455,466 | A | | 10/1995 | Parks et al. |
| 5,596,567 | A | | 1/1997 | deMuro et al. |
| 5,600,225 | A | | 2/1997 | Goto |
| 5,666,530 | A | | 9/1997 | Clark et al. |
| 5,733,313 | A | | 3/1998 | Barreras et al. |
| 5,760,580 | A | | 6/1998 | Tyren |
| 5,780,731 | A | * | 7/1998 | Matsui et al. .............. 73/114.01 |
| 5,831,348 | A | | 11/1998 | Nishizawa |
| 5,958,051 | A | | 9/1999 | Renaud et al. |
| 6,006,274 | A | | 12/1999 | Hawkins et al. |
| 6,138,245 | A | | 10/2000 | Son et al. |
| 6,184,651 | B1 | | 2/2001 | Fernandez et al. |
| 6,266,539 | B1 | | 7/2001 | Pardo |
| 6,330,436 | B1 | | 12/2001 | Zidel |

(Continued)

FOREIGN PATENT DOCUMENTS

| CN | 1592197 A | 3/2005 |
|---|---|---|
| EP | 395469 A2 | 10/1990 |

(Continued)

OTHER PUBLICATIONS

U.S. Appl. No. 11/430,786, filed May 8, 2006, Baraban et al.

(Continued)

*Primary Examiner* — Alexander Satanovsky

(74) *Attorney, Agent, or Firm* — Norton Rose Fulbright US LLP

(57) ABSTRACT

A device includes a receiving surface to magnetically retain the orientation-dependent device in any one of a plurality of possible orientations. The detection device includes circuitry that detects the relative orientation of the orientation-dependent device based on a magnetic orientation of the orientation-dependent device relative to the detection device.

24 Claims, 7 Drawing Sheets

(56) References Cited

U.S. PATENT DOCUMENTS

| | | | |
|---|---|---|---|
| 6,389,423 B1 | 5/2002 | Sakakura | |
| 6,405,049 B2 | 6/2002 | Herrod et al. | |
| 6,436,299 B1 | 8/2002 | Baarman et al. | |
| 6,445,936 B1 | 9/2002 | Cannon et al. | |
| 6,501,364 B1 | 12/2002 | Hui et al. | |
| 6,510,424 B1 | 1/2003 | Ford et al. | |
| 6,532,152 B1 | 3/2003 | White et al. | |
| 6,673,250 B2 | 1/2004 | Kuennen et al. | |
| 6,731,071 B2 | 5/2004 | Baarman | |
| 6,795,110 B1 | 9/2004 | Kossin | |
| 6,803,744 B1 | 10/2004 | Sabo | |
| 6,806,649 B2 | 10/2004 | Mollema et al. | |
| 6,810,405 B1 | 10/2004 | LaRue et al. | |
| 6,812,645 B2 | 11/2004 | Baarman | |
| 6,825,620 B2 | 11/2004 | Kuennen et al. | |
| 6,831,380 B2 * | 12/2004 | Rybnicek et al. | 310/40 MM |
| 6,831,417 B2 | 12/2004 | Baarman | |
| 6,888,438 B2 | 5/2005 | Hui et al. | |
| 6,917,163 B2 | 7/2005 | Baarman | |
| 6,975,198 B2 | 12/2005 | Baarman et al. | |
| 6,986,051 B2 | 1/2006 | Le Pennec et al. | |
| 7,065,658 B1 | 6/2006 | Baraban et al. | |
| 7,116,200 B2 | 10/2006 | Baarman et al. | |
| 7,118,240 B2 | 10/2006 | Baarman et al. | |
| 7,126,450 B2 | 10/2006 | Baarman et al. | |
| 7,132,918 B2 | 11/2006 | Baarman et al. | |
| 7,149,473 B1 | 12/2006 | Lindlar et al. | |
| 7,164,255 B2 | 1/2007 | Hui | |
| 7,248,017 B2 | 7/2007 | Cheng et al. | |
| 7,262,700 B2 | 8/2007 | Hsu | |
| 7,271,569 B2 | 9/2007 | Oglesbee | |
| 7,286,880 B2 | 10/2007 | Olson et al. | |
| 7,331,793 B2 | 2/2008 | Hernandez et al. | |
| 7,375,492 B2 | 5/2008 | Calhoon et al. | |
| 7,382,636 B2 | 6/2008 | Baarman et al. | |
| 7,385,357 B2 | 6/2008 | Kuennen et al. | |
| 7,392,059 B2 | 6/2008 | White et al. | |
| 7,414,380 B2 | 8/2008 | Tang et al. | |
| 7,446,672 B2 | 11/2008 | Johnson et al. | |
| 7,454,170 B2 | 11/2008 | Goossens et al. | |
| 7,462,951 B1 | 12/2008 | Baarman | |
| 7,471,986 B2 | 12/2008 | Hatlestad | |
| 7,495,414 B2 | 2/2009 | Hui | |
| 7,521,890 B2 | 4/2009 | Lee et al. | |
| 7,576,514 B2 | 8/2009 | Hui | |
| 7,711,516 B2 * | 5/2010 | Caritu et al. | 702/153 |
| 7,743,151 B2 | 6/2010 | Vallapureddy et al. | |
| 2002/0084698 A1 | 7/2002 | Kelly et al. | |
| 2002/0103008 A1 | 8/2002 | Rahn et al. | |
| 2003/0214255 A1 | 11/2003 | Baarman et al. | |
| 2003/0233455 A1 | 12/2003 | Leber et al. | |
| 2004/0088012 A1 | 5/2004 | Kroll et al. | |
| 2004/0130915 A1 | 7/2004 | Baarman | |
| 2004/0130916 A1 | 7/2004 | Baarman | |
| 2004/0150934 A1 | 8/2004 | Baarman | |
| 2004/0222751 A1 | 11/2004 | Mollema et al. | |
| 2004/0232845 A1 | 11/2004 | Baarman et al. | |
| 2004/0259499 A1 | 12/2004 | Oba et al. | |
| 2005/0007067 A1 | 1/2005 | Baarman et al. | |
| 2005/0093475 A1 | 5/2005 | Kuennen et al. | |
| 2005/0116650 A1 | 6/2005 | Baarman | |
| 2005/0122058 A1 | 6/2005 | Baarman et al. | |
| 2005/0122059 A1 | 6/2005 | Baarman et al. | |
| 2005/0127849 A1 | 6/2005 | Baarman et al. | |
| 2005/0127850 A1 | 6/2005 | Baarman et al. | |
| 2006/0041420 A1 | 2/2006 | Martin et al. | |
| 2006/0061958 A1 | 3/2006 | Solomon et al. | |
| 2006/0123055 A1 | 6/2006 | Atkinson et al. | |
| 2006/0132045 A1 | 6/2006 | Baarman | |
| 2007/0035917 A1 * | 2/2007 | Hotelling et al. | 361/683 |
| 2007/0064406 A1 | 3/2007 | Beart | |
| 2007/0120752 A1 | 5/2007 | Takasu | |
| 2007/0182367 A1 | 8/2007 | Partovi | |
| 2007/0188284 A1 | 8/2007 | Dobbs | |
| 2007/0246546 A1 | 10/2007 | Yoshida | |
| 2007/0290654 A1 | 12/2007 | Govari et al. | |
| 2008/0133918 A1 | 6/2008 | You et al. | |
| 2008/0196086 A1 | 8/2008 | Shintani et al. | |
| 2008/0231537 A1 | 9/2008 | Rofougaran et al. | |
| 2008/0278894 A1 | 11/2008 | Chen et al. | |
| 2009/0001932 A1 | 1/2009 | Kamijo et al. | |
| 2009/0001941 A1 | 1/2009 | Hsu et al. | |
| 2009/0008148 A1 | 1/2009 | Mashino | |
| 2009/0069869 A1 | 3/2009 | Stouffer et al. | |
| 2009/0088077 A1 | 4/2009 | Brown et al. | |
| 2009/0106567 A1 | 4/2009 | Baarman | |
| 2009/0170433 A1 | 7/2009 | Rhodes et al. | |
| 2009/0212637 A1 * | 8/2009 | Baarman et al. | 307/104 |
| 2009/0212737 A1 | 8/2009 | Johnson et al. | |
| 2010/0007449 A1 | 1/2010 | Tait et al. | |
| 2010/0021176 A1 | 1/2010 | Holcombe et al. | |
| 2010/0045269 A1 | 2/2010 | LaFranchise et al. | |
| 2010/0070219 A1 | 3/2010 | Azancot et al. | |
| 2010/0076524 A1 | 3/2010 | Forsberg et al. | |
| 2010/0081377 A1 | 4/2010 | Corbridge et al. | |
| 2010/0081473 A1 | 4/2010 | Chatterjee et al. | |
| 2010/0081483 A1 | 4/2010 | Chatterjee et al. | |
| 2010/0083012 A1 | 4/2010 | Corbridge et al. | |
| 2010/0121965 A1 | 5/2010 | Chatterjee | |
| 2010/0131691 A1 | 5/2010 | Chatterjee et al. | |
| 2010/0146308 A1 | 6/2010 | Gioscia et al. | |
| 2010/0156193 A1 | 6/2010 | Rhodes et al. | |
| 2010/0172090 A1 | 7/2010 | Chatterjee | |
| 2010/0177476 A1 | 7/2010 | Hotelling et al. | |
| 2010/0194336 A1 | 8/2010 | Azancot et al. | |

FOREIGN PATENT DOCUMENTS

| | | |
|---|---|---|
| FR | 2601161 A1 | 1/1988 |
| GB | 2389720 B | 9/2005 |
| GB | 2399466 B | 11/2005 |
| GB | 2389767 B | 4/2006 |
| JP | 09-259241 A | 10/1997 |
| JP | 11-354348 A | 12/1999 |
| JP | 3161388 B2 | 2/2001 |
| KR | 10-0836634 B1 | 6/2008 |
| WO | WO 95/03686 A1 | 2/1995 |
| WO | WO 2005/024865 A2 | 3/1995 |
| WO | WO 2004/098079 A1 | 11/2004 |
| WO | WO 2008/033670 A2 | 3/2008 |
| WO | WO 2008/044875 A1 | 4/2008 |
| WO | WO 2008/133806 A1 | 11/2008 |
| WO | WO 2009/057771 A1 | 5/2009 |
| WO | WO 2010/005324 A1 | 1/2010 |
| WO | WO 2010/062198 A1 | 6/2010 |
| WO | WO 2010/068062 A2 | 6/2010 |
| WO | WO 2010/068062 A3 | 7/2010 |
| WO | WO 2010/091269 A1 | 8/2010 |

OTHER PUBLICATIONS

U.S. Appl. No. 12/628,401, filed Dec. 1, 2009, Chatterjee.
U.S. Appl. No. 12/841,001, filed Jul. 21, 2010, Chatterjee.
U.S. Appl. No. 29/323,688, filed Aug. 28, 2008, Matsuoka.
Final Office Action mailed Jan. 8, 2009 in U.S. Appl. No. 11/430,786.
Final Office Action mailed Oct. 25, 2004 in U.S. Appl. No. 09/861,658 10 pgs.
Final Office Action mailed Jul. 9, 2007 in U.S. Appl. 11/430,786.
Final Office Action mailed Jul. 19, 2010 in U.S. Appl. No. 11/430,786.
Final Office Action mailed Dec. 30, 2009 in U.S. Appl. No. 11/430,786.
Hui et al., "A New Generation of Universal Contactless Battery Charging Platform for Portable Consumer Electronic Equipment," IEEE Trans Power Electronics, 20(3):620-627 (2005).
International Search Report and Written Opinion dated Jul. 21, 2010 in International Application No. PCT/US2009/068328.
International Search Report and Written Opinion dated Jul. 28, 2010 in International Application No. PCT/US2009/068332.
International Search Report and Written Opinion dated Aug. 20, 2010 in International Application No. PCT/US2009/069847.
International Search Report and Writen Opinion dated Aug. 31, 2010 in International Application No. PCT/US2010/020054.

(56) References Cited

OTHER PUBLICATIONS

International Search Report and Written Opinion dated Apr. 20, 2010 in International Application No. PCT/US2009/055928.
Kean, Steven, "Powermat Portable Wireless Charging Mat", pp. 1-12 dwnloaded from http://www.bigbruin.com/content/powermat_1 on Sep. 29, 2010.
Liang et al., "An implantable bi-directional wireless transmission system for transcutaneous biological signal recording," Physiol. Meas. 26:83-97 (2005).
Mel, B. W. et al., "Tablet: Personal Computer in the Year 2000", Communications of the Association for Computing machinery, New Your, NY vol. 31, No. 6, Jun. 1, 1988, 639-646 XP000047633ISSN: 0001-0782.
Non-Final Office Action mailed Mar. 24, 2010 in U.S. Appl. No. 11/430,786.
Non-Final Office Action mailed Jul. 25, 2008 in U.S. Appl. No. 11/430,786.
Non-Final Office Action mailed Sep. 30, 2010 in U.S. Appl. No. 11/430,786 7 pgs.
Non-Final Office Action mailed Jan. 25, 2008 in U.S. Appl. No. 11/430,786.
Non-Final Office Action mailed Oct. 5, 2006 in U.S. Appl. No. 11/430,786.
Non-Final Office Action mailed Apr. 22, 2004 in U.S. Appl. No. 09/861,658 7 pgs.
Non-Final Office Action mailed Apr. 7, 2005 in U.S. Appl. No. 09/861,658 11 pgs.
Non-Final Office Action mailed Jun. 11, 2009 in U.S. Appl. No. 11/430,786.
Notice of Allowance mailed Jan. 9, 2006 in U.S. Appl. No. 09/861,658 12 pgs.
Opticon Users manual DWT 7133, Nov. 2000.
Non-Final Office Action mailed Nov. 3, 2010 in U.S. Appl. No. 12/478,616 12 pgs.
U.S. Appl. No. 12/916,388, filed Oct. 29, 2010, Chatterjee et al.
U.S. Appl. No. 12/975,335, filed Dec. 21, 2010, Oh et al.
U.S. Appl. No. 12/987,940, filed Jan. 10, 2011, Chatterjee et al.

* cited by examiner

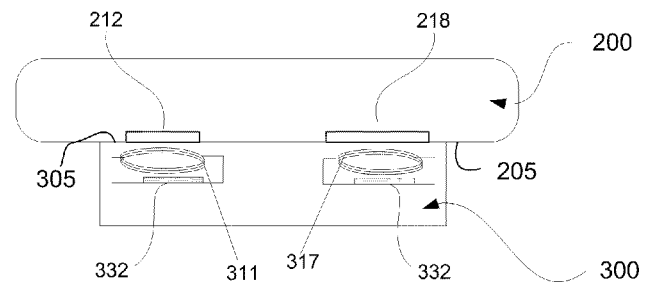
FIG. 3A
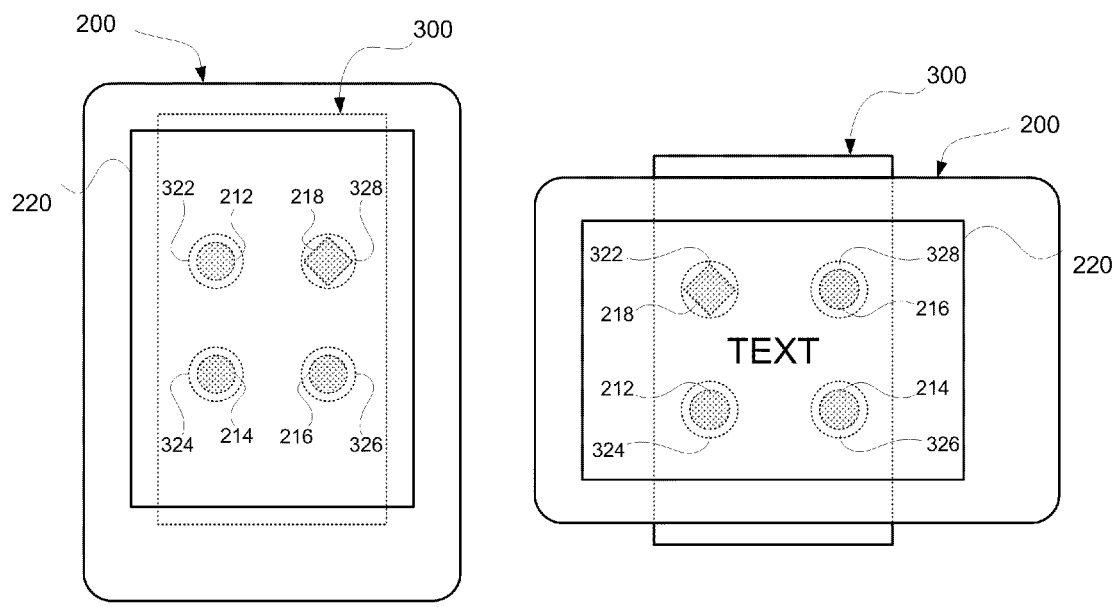
FIG. 3B
FIG. 3C

SYSTEM FOR DETECTING ORIENTATION OF MAGNETICALLY COUPLED DEVICES

RELATED APPLICATIONS

This application claims benefit of priority to Provisional U.S. Patent Application No. 61/227,418, filed Jul. 21, 2009; the aforementioned priority application being hereby incorporated by reference in its entirety.

TECHNICAL FIELD

The disclosed embodiments relate to a system for detecting orientation of magnetically coupled devices.

BACKGROUND

With the advance of technology, computing devices, particularly mobile computing devices and other small form-factor computing devices, increasingly are becoming more capable and functional. Mobile computing devices are now used for an assortment of functions, including telephony, messaging, web browsing, media playback, image/video capture, and location based services. At the same time, mobile computing devices now have display surfaces that are designed to be operable in multiple orientations (e.g., landscape and portrait), thus allowing greater optimization for certain functions and/or flexibility to suit a user's preferences.

Some devices now incorporate accelerometers or gravity sensors to automatically reorient the display output depending on how the display surface is positioned relative to the earth's gravitational force. However, such sensors do not provide a convenient way of reorienting the display output when the orientation-dependent device lies flat (i.e., substantially perpendicular to gravity) or at a low angle.

BRIEF DESCRIPTION OF THE DRAWINGS

FIG. 3A is a side view illustrating an active coupling between an orientation-dependent device and a detection device, according to some embodiments.

FIG. 3B is a frontal view of the orientation-dependent device actively coupled to the detection device in a given orientation, under an embodiment.

FIG. 3C illustrates the orientation-dependent device and the detection device actively coupled in another orientation, under an embodiment.

DETAILED DESCRIPTION

Figure 1:
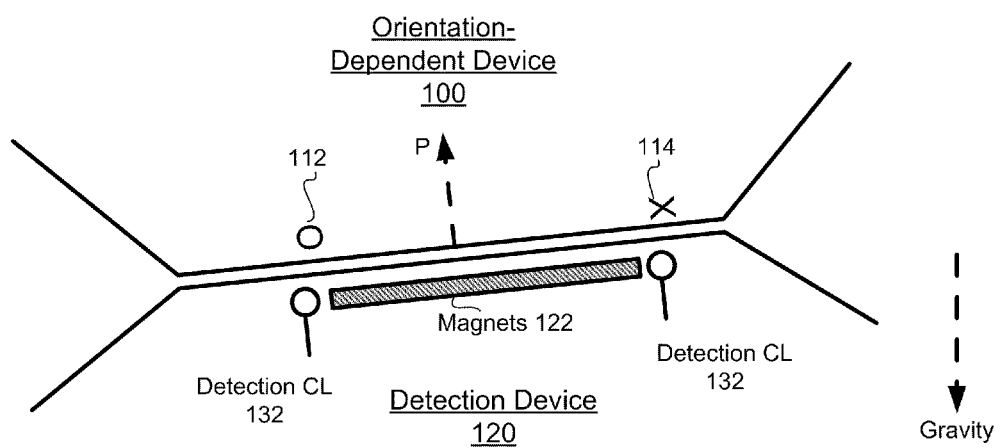
FIG. 1 illustrates an orientation detection system that is incorporated amongst a pair of devices that are magnetically coupled, according to one or more embodiments.

Embodiments described herein provide a system in which the orientation of an orientation-dependent device can be determined when the orientation-dependent device is coupled or positioned against another device. Such embodiments enable orientation determination to be performed even when the orientation-dependent device is held relatively flat, or at a relatively low-angle.

According to some embodiments, a system is provided that includes an orientation-dependent device and a detection device. The orientation-dependent device has multiple orientation-dependent modes of operation. The detection device includes a receiving surface to magnetically retain the orientation-dependent device in any one multiple possible orientations. The detection device includes circuitry that detects the relative orientation of the orientation-dependent device based on a magnetic orientation of the orientation-dependent device relative to the detection device.

A system includes an orientation-dependent device having multiple modes of operation, and a detection device having a receiving surface to magnetically retain the orientation-dependent device in anyone of multiple possible orientations relative to the detection device. The detection device includes detection circuitry to detect the relative orientation of the orientation-dependent device, and a communication interface to communication orientation information indicative of the relative orientation to the orientation-dependent device. When retained by the detection device, the orientation-dependent device is configured for operation in one of the multiple modes based, at least in part, on the orientation information.

Still further, embodiments include an orientation-dependent device being brought into contact or proximity with a detection device for purposes of signaling power and/or data between the two devices using a 'connector-less' signal interface. Specific examples of connector-less signal interfaces include conductive and inductive signal interfaces such as described in U.S. patent application Ser. No. 12/239,656, filed Sep. 26, 2008, and U.S. patent application Ser. No. 12/478,766 filed Jun. 4, 2009 (both of which are incorporated by reference herein).

According to some embodiments, the orientation of an orientation-dependent device is determined based on an inherent or manufactured alignment disparity present in a magnetic coupling between the orientation-dependent device and another device.

In one embodiment, magnetic elements are used for connecting the orientation-dependent device to the detection device. The magnetic elements may be disposed in a predetermined pattern, such that the detection device is able to determine the relative orientation of the orientation-dependent device from the manner in which a set of magnetic elements in the orientation-dependent device align or connect to a corresponding set of magnetic elements in the detection device.

As used herein, a magnetic element is an element that produces and/or is responsive to a magnetic field. In an embodiment, the magnetic elements correspond to metal tabs that are provided within the orientation-dependent device, in a predetermined pattern, which can be detected and/or analyzed for orientation information by elements of the detection device.

Further, embodiments provide that the detection device includes elements, such as active coils and associated circuitry, which are positioned to detect magnetic fields of the magnetic elements (e.g. ferrous tabs) on the orientation-dependent device. Such elements of the detection device may correlate variations in the magnetic fields of the individual tabs, as detected by one or more coils, to positional information of the magnetic elements. The relative orientation of the orientation dependent device may be determined from the position of the magnetic elements.

According to one embodiment, an orientation-dependent device may configure (or reconfigure) a display output based on its relative orientation to a detection device. The orientation-dependent device may be operable in a number of modes including, for example, "portrait" and "landscape" modes. Specifically, the detection device may communicate orientation information to the orientation-dependent device, which then programmatically configures its display output based on the received orientation information. In some embodiments, the orientation-dependent device may programmatically reorient its display output regardless of its orientation relative to gravity.

As used herein, the term "substantial" or its variants (e.g. "substantially") is intended to mean at least 75% of the stated quantity, measurement or expression. The term "majority" is intended to mean more than 50% of such stated quantity, measurement, or expression.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor (s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many smart phones and feature phones), and magnetic memory. Computers, terminals, network enabled devices (e.g. mobile devices such as cell phones) are all examples of machines and devices that utilize processors, memory, and instructions stored on computer-readable mediums.

FIG. 1 illustrates an orientation detection system that is incorporated amongst a pair of devices that are magnetically coupled, according to one or more embodiments. The orientation detection system is distributed between an orientation-dependent (OD) device 100 and a detection device 120. As will be described, the orientation detection system determines an orientation of the OD device 100 when it is actively retained against the detection device 120. The orientation detection system includes magnetic elements distributed between the OD device 100 and the detection device 120 for forming a clasp or retention mechanism for the two devices, as well as detection circuitry and logic 132 for identifying an orientation marker from the magnetic clasps that actively retain the two devices.

In particular, embodiments such as described determine the relative orientation of OD device 100 about an axis of rotation P. For example, the OD device 100 can correspond to a display device (e.g. mobile computing device) that can be placed on a dock (detection device 120) and then rotated between portrait (0 degrees), landscape (90 degrees), reverse portrait (180 degrees) and/or reverse landscape (270 degrees), as well as positions in between.

An embodiment such as described enables OD device 100 to programmatically or automatically identify its orientation (about P), even when the devices relative orientation with gravity (g) is slight. In contrast, past approaches rely on accelerometers and similar sensors which require the orientation device to be upright or vertical with respect to gravity in order to rely on sensors for determining the device's orientation (e.g. landscape or portrait).

In more detail, some embodiments provide that the magnetic elements of the orientation detection system include the following: magnetically attractive structures (tabs) 112, 114 on OD device 100, and one or more magnets 122 on detection device 120. Alternatively, one or more magnets are provided on OD device 100, and the detection device 120 can provide either magnets or magnetically attracted elements. The tabs 112, 114 can vary in number, and may be arranged in different patterns or shapes. In one embodiment, four tabs 112, 114 are used, with one tab 114 serving as an orientation marker.

The magnet(s) 122 extend the magnetic field to the tabs 112, 114 to form a magnetic clasp that retains the OD device 100 against the detection device 120. Each tab 112, 114 has mass that can be detected by detection circuitry 132 of the detection device 120. The tabs 112, 114 may include a majority (e.g. all but one) that are identical in size and shape. In an embodiment such as described, however, one tab 114 is not like the others, in that tab 114 may have a different size or shape (and thus different mass) from the other tabs. Still further, tab 114 may be formed from a different material, or positioned differently relative to other tabs.

As an alternative, tab 114 may be nonexistent, so that its non-presence is what produces a distinguishable result with the detection circuitry. Thus, numerous variations are possible to providing tab 114 with a different shape and/or size or other characteristic.

The detection circuitry 132 is included on the detection device 120 to detect or produce electrical characteristics for each of the tabs 112, 114. In one embodiment, the detection circuitry includes one or more active, electrically pulsed elements (e.g. carry current from a power source on the detection device 120) that are affected by the mass of the corresponding one of the tabs 112, 114 to which that detection circuit is aligned or positioned near. As active elements, a measurable electrical characteristic of the individual detection circuits (e.g. induced phase) is influenced by the tabs 112, 114, and the marker tab 114 influences an aligned detection circuit 132 differently than the other tabs 112. More specifically, the detection circuitry 132 may include use of one or more coils that produce a magnetic field, and which electrically respond to presence of tabs 112, 114 (which are formed from magnetic material such as ferrous). In one embodiment, the tabs 112, 114 differ in mass (e.g. the tabs can be shaped differently), and the coil(s) of the detection circuitry 132 can be used to generate a response that is sensitive to the variation in mass amongst the tabs 112, 114. This difference in mass is correlated to an electrical characteristic, which identifies the position of the marker tab 114, and thus the orientation of the device.

In an embodiment, individual detection circuits are provided on the detection device, to be positioned proximate to a corresponding tab 112, 114 when the OD device 100 is brought into contact with detection device 120 in one of multiple possible orientations. The detection circuits 132 include active coils or other elements that respond to a magnetic differentiation amongst the individual tabs 112, 114. For example, as described with other embodiments, the detection circuits 132 may utilize two or four active coils to detect magnetic field variations that result from the tabs 12, 14 having different masses. Logic associated with the detection circuits 132 is able to correlate the detected magnetic variation resulting from the marker tab 114 with a position of that tab. This location of the marker tab 114 can then be correlated to an orientation of the device 100 against the detection device 120.

In one embodiment, the detection device 120 communicates the orientation of the OD device 100 to the OD device 100. For example, the detection device 120 may communicate orientation information to the OD device 100 using a radio frequency channel (e.g. Bluetooth, WiFi, or wireless USB). As an alternative, the devices 100, 120 are inductively coupled to exchange power and/or data. In such embodiments, the orientation information may be communicated by detection device 120 to the OD device 100 via an inductive signal interface. Examples of an inductive signal interface are described with U.S. patent application Ser. No. 12/239,656 and U.S. patent application Ser. No. 12/478,766 (both of which are incorporated by reference herein).

While an embodiment of FIG. 1 shows the detection circuits 132 on the detection device 120, variations may provide that some or all of the detection circuits 132 (including the detection logic) are provided on the OD device 100. Thus, the OD device 100 can include the detection resources, and may determine its own orientation using, for example, a magnet of another device.

Figure 2:
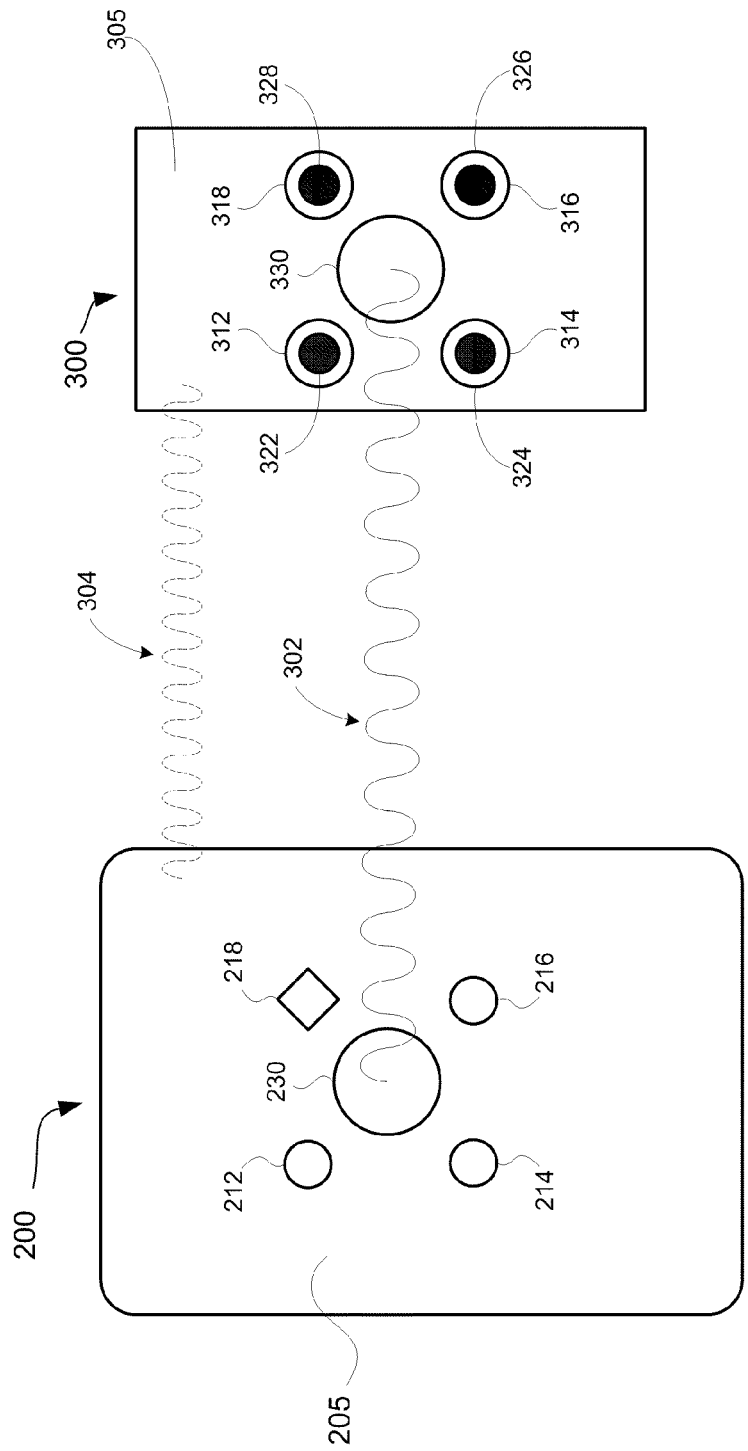
FIG. 2 illustrates an orientation detection system for use with an orientation-dependent device that is to be brought into contact with a corresponding detection device, according to one or more embodiment.

FIG. 2 illustrates an orientation detection system for use with an orientation-dependent device that is to be brought into contact with a corresponding detection device, according to one or more embodiment. More specifically, FIG. 2 illustrates a rear facade 205 (or contact surface) of an OD device 200, and a receiving surface 305 of a detection device 300 against which the OD device 200 can be retained. The devices 200, 300 can magnetically couple to one another, so that magnetic forces actively retain the rear façade 205 of the OD device 200 against the receiving surface 305 of the detection device 300. In one implementation, the OD device 200 can correspond to a mobile computing device (e.g. multipurpose device capable of cellular telephony, messaging and data usage), and the detection device 300 can correspond to a dock for providing power to the mobile computing device. The OD device 200 can be docked onto the detection device 300 in any one of multiple possible orientations (see e.g. axis P in FIG. 1), such as two or more of the following orientations: portrait (0 degrees), landscape (90 degrees), reverse portrait (180 degrees), or reverse landscape orientations (270 degrees), as well as positions in between or along an arc from those positions stated. As mentioned with other embodiments, the docking angle between the two devices may be insufficient relative to the gravitational axis to enable proper operation of the accelerometer or other gravitational dependent sensors typically used to detect the orientation of the device. To accommodate such a scenario, an orientation detection system may be provided on the devices 200, 300 to enable the OD device 200 to detect its relative orientation against the detection device 300, even when the OD device 200 has a relatively flat angle with respect to gravity.

In one embodiment, the rear façade 205 of the OD device 200 includes an arrangement of tabs 212-218 that are magnetic elements. For example, the tabs 212-218 can be formed from a magnetic or ferrous material, such as iron or steel. Alternatively, the tabs 212-218 may be formed from magnets. The detection device 300 includes one or more magnets 322-328, of which at least some can align with the tabs 212-218 of the detection device 300, depending on the orientation of the OD device 200. Different arrangements of magnets 322-328 may be used for the detection device 300. For example, four magnets may be distributed in a square or rectangular pattern. Alternatively, one circular magnet or multiple arced magnets may be used on the detection circuit 322-328 to retain the OD device 200 in any position along its arc. Various arrangements for using magnets in such a coupling environment are described in U.S. patent application Ser. Nos. 12/239,656 and 12/478,763 (both of which are incorporated by reference herein). For purposes of illustration, only four magnets 322-328 are shown on the detection device 300 of FIG. 2, and with other examples shown by other figures. However, more or fewer magnets may be provided in other embodiments to correspondingly provide more or fewer orientation angles for connecting an orientation-dependent device to the detection device 300.

When the two devices 200, 300 are brought together, the tabs 212-218 and magnet(s) 322-328 form magnetically couplings. The OD device 200 can have multiple possible orientations when it is placed on the detection device 300, and the pairing or location of the tabs 212-218 relative to the magnet or magnets of the detection device 300 depends on the orientation of the OD device 200 when it is placed on the receiving surface 305 of the detection device 300.

In an embodiment, one of the tabs 218 is an orientation marker. In particular, tab 218 can be structured to be distinguishable from the rest of the tabs 212-216 based on its size, shape, and/or density. In addition, the marker tab 218 may exhibit different magnetic properties than the other tabs 212-216. As described below, this difference is electrically identifiable by location using detection circuitry on the detection device 300. The location of the marker tab 218 can be correlated to the orientation of the device 300.

As an alternative or addition to varying mass (e.g. by shape or size) of the marker tab 218, the marker tab 218 may be formed from a different material than the other tabs 212-216. In one embodiment, the marker tab 218 is 'holed' or ring-shaped so that it has no magnetic material in its interior, and the other tabs 212-216 are solid. The reverse configuration can also be used (marker tab 218 is solid, and the other tabs are holed or ringed).

According to an embodiment, the tabs 212-218 are arranged in a pattern on the rear façade 205. In the example shown, the 212-218 are arranged in a square or rectangular-like pattern with the marker tab 218 forming the upper right corner of the square. Still further, the tabs 212-218 can be arranged in a number of alternative patterns (e.g., a circular, oval, racetrack, trapezoidal, or diamond arrangement), or even arranged to omit use of the marker tab (e.g. using an asymmetric shape where one tab is 'missing'). Still further, some embodiments may use multiple marker tabs for orientation and/or alignment purposes. For example, in one implementation, a single marker tab may co-exist with an another arrangement of coupling tabs (e.g. 4 tabs in rectilinear arrangement with marker tab separately positioned from the four coupling tabs). Moreover, while four tabs 212-218 are shown, more or fewer tabs may be used depending on implementation factors. Accordingly, the tabs may therefore be arranged in a wide variety of patterns. While having fewer tabs may be cheaper and more efficient to implement, more tabs provide a greater number of orientation angles for connecting the OD device 200 to a detection device. More specifically, the number of tabs used and/or their pattern of arrangement directly affects the total mass of magnetic material that is (or must be) sensed by detection circuitry on the detection device 300.

In addition to being magnetically coupled, the two devices may be connected to exchange data and power through a connectorless interface. More specifically, the OD device 200 and the detection device 300 may be inductively coupled to exchange data and/or power using an inductive signal interface such as described in U.S. patent application Ser. No. 12/239,656 and U.S. patent application Ser. No. 12/478,763 (using a real-time communication protocol). In such embodiments, the tabs 212-218 have a primary use of enabling the OD device 200 to be magnetically coupled to the detection device 300. Thus, the use of tabs 212-218 to identify orientation information may provide a secondary or alternative use for the tabs.

Accordingly, some embodiments provide that the OD device 200 includes an inductive signal interface 230, and that the detection device 300 includes a corresponding inductive signal interface 330. Each device 200, 300 may use its signal interface 230, 330 to signal or receive power or data (inductive signal 302) with the other device when the two devices are inductively coupled. As an addition or alternative, the OD device 200 may communicate with the detection device 300 via a radio frequency (RF) signal 304 (e.g., Bluetooth, WiFi, Wireless USB, and/or any other wireless standard). In one embodiment, the two devices communicate using both the inductive signal 302 and the wireless communication 304. For example, the inductive signal 302 can be used to establish a wireless channel from which subsequent RF-type wireless communications can take place.

The detection device 300 includes a number of orientation detection circuits 312-318, as well as the one or more magnets 322-328 which form magnetic pairings with the tabs 212-218 of the OD device 200. The orientation detection circuits 312-318 and the magnet(s) 322-328 are disposed beneath the receiving surface 305 of the detection device 300. In this way, the receiving surface 305 is able to provide a landing space for receiving and magnetically coupling with the bottom side of an orientation-dependent device.

In some embodiments, each of the detection circuits 312-318 utilize one or more elements that are responsive to magnetic fields that are inherently present with the tabs 212-218 of the OD device 200. More specifically, each of the detection circuits 312-318 may incorporate or utilize a coil that identifies an electrical response caused by presence of the individual tabs (when the two devices are magnetically coupled). The coil(s) used by each of the detection circuits 332 is sufficiently responsive to the magnetic field of the individual tabs 212-218, so that the difference in the magnetic field of the marker tab 218 causes a distinct electrical response from the detection circuits 332.

In an embodiment such as shown, the detection circuits 312-318 provided with the detection device 300 are depicted as being aligned with individual tabs 212-218 of the OD device 200. Such alignment may position the coils of the detection circuits 312-318 in direct proximity to tabs 212-218 of the OD device. When activated, the individual detection circuits generate responses that are skewed and reflective of the position of the marker tab 218. In other embodiments, the coils of the detection circuits may be distributed in positions that are in between the tabs or magnets of the detection device. The activated coils may be sufficiently proximate to each tab to detect magnetic differentiation resulting from a variation in one of the tabs 218.

In addition to detection circuitry 332, the detection device 300 can include logic (e.g. integrated circuitry, processor) to process the electrical responses of the detection circuitry 312-318 to the presence of the tabs 212-218. The logic is used to determine the position or alignment of the marker tab 218 of the OD device 200. In one embodiment, processing resources or logic of the detection device 300 generates orientation information based on the location of the marker tab. The detection device 300 transmits the orientation information to the orientation-dependent device 200 using, for example, an inductive or RF communication medium, or alternatively an inductive communication medium.

In alternative embodiments, the orientation detection circuitry in the two devices 200 and 300 may be swapped, so that the OD device 200 can be configured to detect its own orientation relative to the detection device 300 (i.e., without having to receive orientation information from the detection device 300). More specifically, tabs may be provided on the detection device 300 instead of (or in addition to) the tabs 212-218 on the OD device 200. Similarly, detection circuits (including coils) and/or magnets may be provided on the OD device 200 instead of (or in addition to) the detection circuits 312-318 and/or magnets 322-328 on the detection device 300.

FIG. 3A is a side view illustrating an active coupling between the OD device 200 and the detection device 300, according to some embodiments. In one embodiment, the OD device 200 makes contact with the detection device 300 by resting its rear façade 205 on the receiving surface 305 of the detection device 300. The OD device 200 is magnetically coupled to and actively retained by the detection device 300 via magnets of the detection device 300 that are aligned with its tabs 212-218.

According to embodiments, the detection circuitry 332 of the detection device uses one or more coils 311, 317 that are positioned near the tabs 212-218. When the coils 311, 317 are activated or pulsed, presence of the tabs 212-218 affects the magnetic field produced from the coils. As mentioned elsewhere, the tabs 212-218 are structured to include an orientation marker that is magnetically identifiable. In one embodiment, the tab 218 is an orientation marker, in that it has mass that is different than the other tabs. The detection circuitry 332 and associated logic are structured to identify reference magnetic fields for each orientation that the OD device 200 can have when actively retained on the detection device 300.

Further, the detection circuitry 332 is structured to produce a characteristic electrical response for the magnetic field that results when the two devices are positioned in a particular orientation (e.g. portrait or landscape). The logic 333 may associate electrical response with the particular orientation.

As described elsewhere, different coil configurations can be used to determine the magnetic field characteristic of the two devices when magnetically coupled. For example, the detection device 300 can include one coil that is shared by multiple detection circuits. Alternatively, two or more coils can be used with the detection circuitry 332. Still further, in implementations that incorporate inductive coupling, the coils used as part of one or more of detection circuits 332 to determine orientation information can coincide with coils used to enable inductive coupling between the OD device 200 and the detection device 300. Specific electrical characteristics that can be measured The detection circuitry 332, in cooperation with coils 311, 317, are structured to detect various kinds of electrical characteristics that are responses to the presence of magnetic mass of the individual tabs. The detection circuitry 332 can, for example, be structured to measure responses that are in the form of phase responses, frequency responses, or other forms of measurable electrical skew. For example, in one implementation, the detection circuitry 332 may include separate circuits for each tab 212-218. The detection circuitry 332 may measure, for example, time constants (e.g. L/R constant) of signals affected or caused by the activated coil(s) and individual tabs 212-218. The tab(s) 212-218 with greater mass (e.g. marker tab 218) may produce a slower response in a corresponding coil, thus indicating the position of the marker tab 218.

FIG. 3B is a frontal view of the OD device 200 and detection device 300 actively coupled, under an embodiment. The tabs 212-218 on the device 200 can align with corresponding magnets 322-328 of the detection device 300, and the position of the orientation tab 218 is used to determine the orientation of the OD device 200 on the detection device 300. According to embodiments, the OD device 200 is configurable to operate in multiple orientation modes, including portrait, landscape, reverse portrait, and reverse landscape. For example, the OD device 200 can reconfigure its display screen 220 to be operable in a "second" portrait mode when its relative orientation is offset by 180°. Similarly, as shown by FIG. 3C, when the detection device 300 detects that, for example, the marker tab 218 is aligned with detection circuit 314, it may transmit orientation information to the OD device 200 instructing the OD device 200 to configure the display 220 in the reverse portrait orientation. Likewise, when the tab 218 is aligned with the magnet 322, the display 220 may be configured in a landscape orientation.

It should be noted that, the detection circuits 332 are not limited to those described above. Specifically, other well-known methods of metal detection may be implemented by the detection circuits 332 with little or no modification to the embodiments described herein. In some embodiments, the absence of one of the tabs 212-218 may be used in lieu of an actual marker tab 218.

In some implementations, even when the OD device 200 is rotated (e.g., as shown in FIG. 3C), the screen content presented on the display surface 220 does not change in orientation. More specifically, the OD device 200 configures the display output presented on the display surface 220 so that its content (images and text) are oriented relative to the detection device 300 rather than the OD device 200.

The embodiments described above provide several advantages over the prior art. For example, the detection device 300 enables the OD device 200 to configure its display output based on its relative orientation to the detection device, without the use of accelerometers or gravity sensors. This, in turn, allows for detection devices (e.g., charging docks) to be made smaller and flatter and/or to accommodate even larger orientation-dependent devices while still taking advantage of the multiple modes of operation of such orientation-dependent devices.

Figure 4:
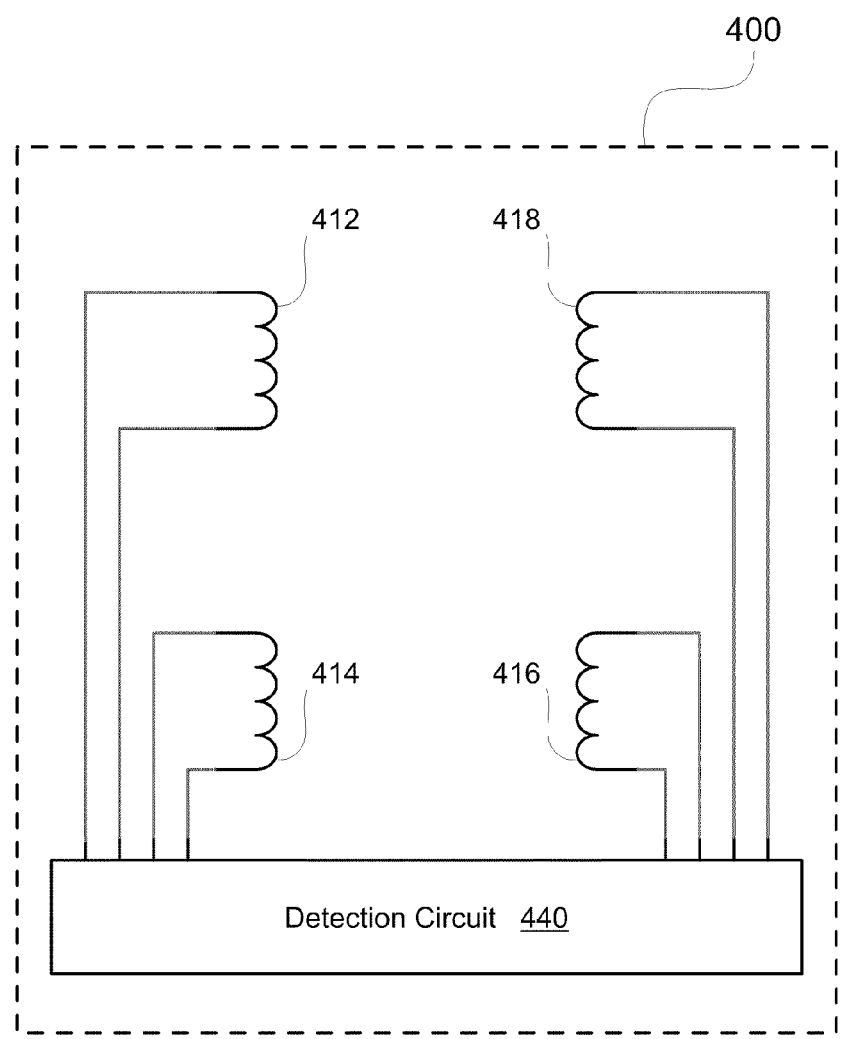
FIG. 4 illustrates a detection device using detection circuitry that incorporates use of two coils in order to detect the relative orientation of an orientation-dependent device, according to an embodiment.

FIG. 4 illustrates a detection device using detection circuitry that incorporates use of four individual coils in order to detect the relative orientation of an orientation-dependent device, according to an embodiment. The detection device 400 includes four coils 412-418 and a detection circuit 450 for detecting the relative orientation of an orientation-dependent device. Each of the coils 412-418 can be activated or pulsed in presence of tabs 212-218 of the OD device 200 (see FIG. 2) in order to generate an electrical response. The detection circuit 440 identifies an electrical skew produced from the difference amongst the tabs of the OD device. In some implementations, the electrical skew characteristic may be derived from response time, and thus correspond to a time-dependent constant. As additions or alternatives, the electrical characteristic that is skewed by the different amongst the tabs may be measured from phase or frequency responses of output from the coils 412-418.

Figure 5:
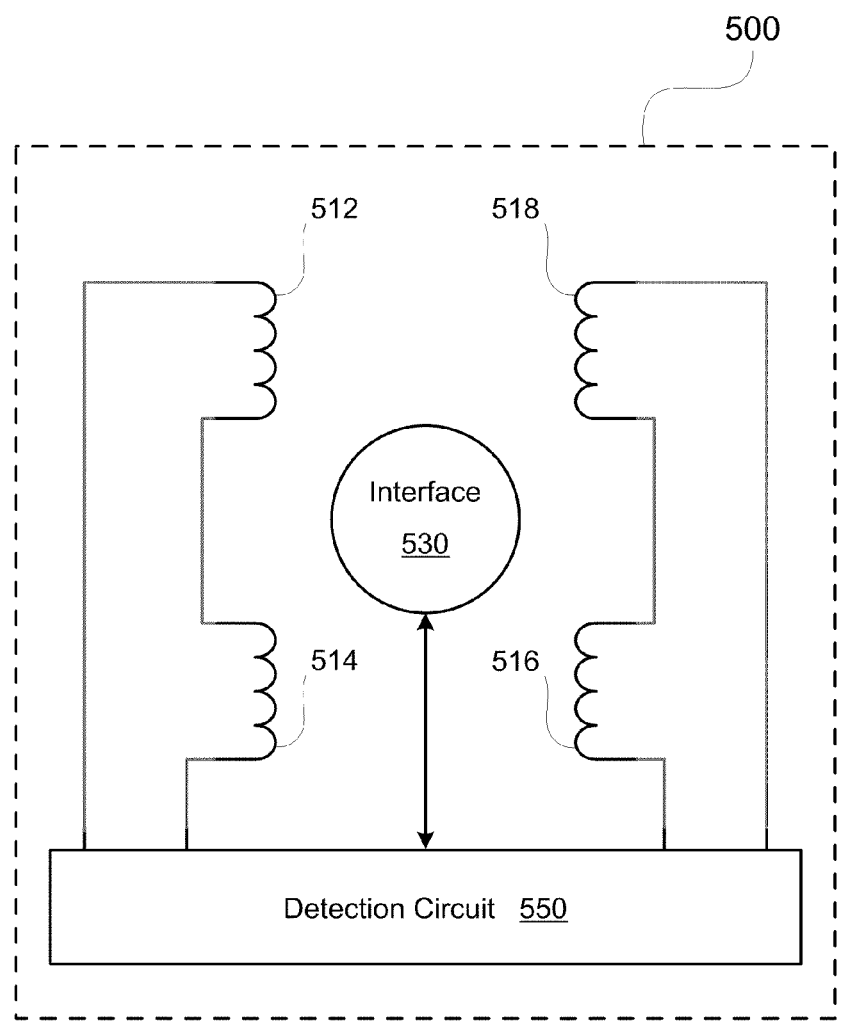
FIG. 5 illustrates a detection device using detection circuitry that incorporates use of four coils in order to detect the relative orientation of an orientation-dependent device, according to an embodiment.

FIG. 5 illustrates a detection device using detection circuitry that incorporates use of two coil pairs in order to detect the relative orientation of an orientation-dependent device, according to an embodiment. The detection device 500 includes four coils 512-518 connected to a detection circuit 550. The detection device 600 may operate in a similar manner as the detection device 500 (as described above with reference to FIG. 4). However, according to an embodiment, the pairs of coils 512/514 and 516/518 are connected in series to the detection circuit 550. In other words, the coil pairs 512/514 and 516/518 are formed on two separate circuits. The left circuit includes coils 512 and 514 and the right circuit includes coils 516 and 518. According to an embodiment, the two coils in each coil pair 512/514 and 516/18 are different so that a relative difference sensed by the pair can be more easily detected. For example, coil 512 may be formed from larger and/or more coils than coil 514, or vice-versa. As described with an embodiment of FIG. 4, the output of the coils 512-518 is processed by detection circuitry 550 to determine an electrical characteristic, such as skew in phase or frequency, in order to determine the location of the marker tab.

According to an embodiment, the detection device 500 is able to detect at least two relative orientations of the orientation-dependent device. For example, if an orientation-dependent device is operable in two portrait modes (e.g., offsets of 0° and 180°), the detection device 500 may be configured to detect whether a marker tab in the orientation-dependent device is aligned with coil 514 or 518. On the other hand, if an orientation-dependent device is operable in two landscape modes (e.g., offsets of 90° and 270°), the detection device 500 may be configured to detect whether the marker tab is aligned with coil 512 or 516.

In some embodiments, hardware costs may be reduced by forming each of the coil pairs 512/514 and 516/518 from a single wire. Additional hardware savings are achieved in the detection circuit 550, because the detection circuit 550 only needs to control and/or detect a flow of current across two wires (compared with four, in the embodiment of FIG. 5). In alternative embodiments, the hardware costs may be reduced even further, for example, by eliminating one of the coils in each of the coil pairs 512/514 and 516/518. For example, if the detection device 500 is to be paired with an orientation-dependent device that is only configurable in two portrait modes of operation, coils 512 and 516 may thus be unnecessary.

Figure 6:
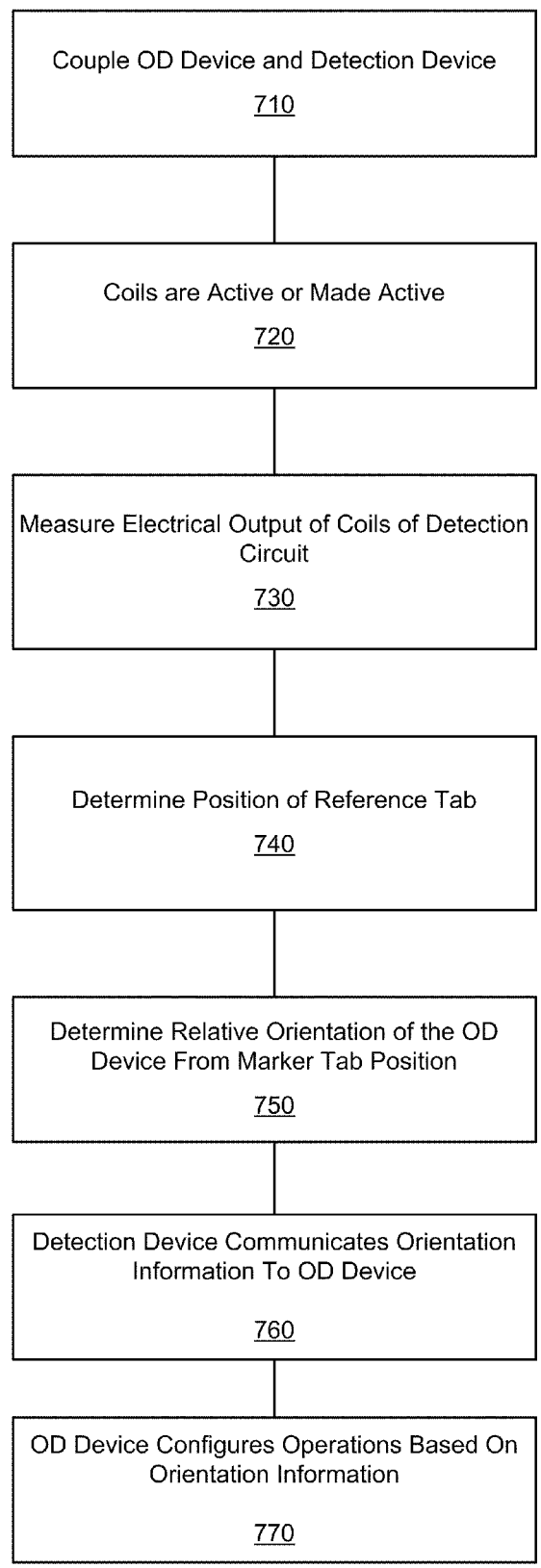
FIG. 6 illustrates a process for detecting the orientation of an orientation-dependent device relative to a detection device, according to an embodiment.

FIG. 6 illustrates a process for detecting the orientation of an orientation-dependent device relative to a detection device, according to an embodiment. In describing an embodiment of FIG. 6A, reference is made to FIG. 2 in order to describe suitable elements or components for performing a step or sub-step being described. The OD device 200 is magnetically coupled to the detection device 300 (step 710). The coils incorporated with detection circuits 332 of the detection device 300 are activated or pulsed (e.g. pulsed repeatedly before and after the magnetic coupling is present) (step 720).

The influence of the magnetic fields from the tabs 212-218 of the OD device 200 are measured from electrical characteristics of the output from the coils of the detection circuits (step 730).

Detection logic then determines the position or alignment of a marker tab in the orientation-dependent device based on the electrical characteristics in the output of the detection circuits (step 740).

The detection device 300 may determine the relative orientation of the orientation-dependent device (step 750) based on the position or alignment of the marker tab. Alternatively, this determination may be made on the OD device 200, using information (e.g. raw data) provided from the detection device. The detection device 300 then communicates the determined orientation information to the OD device 200 (step 760). The orientation-dependent device may then configure (or reconfigure) its mode or operation (e.g. display output) in a manner that is designated for the identified orientation (step 770).

Figure 7:
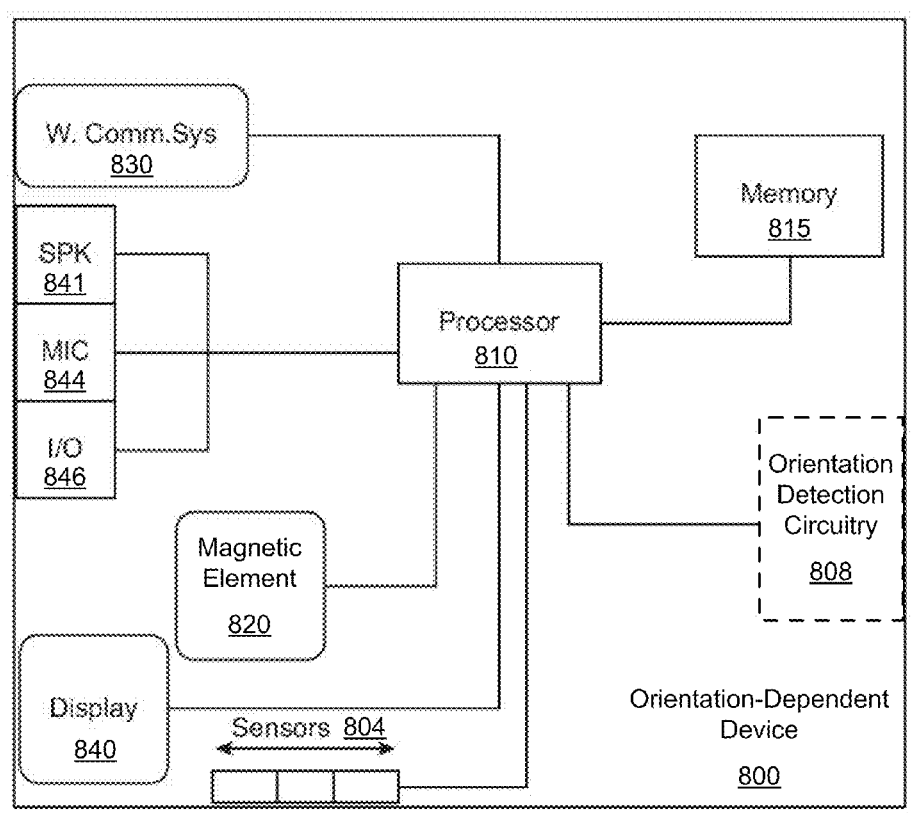
FIG. 7 is a hardware diagram for an orientation-dependent device that is configured in accordance with embodiments described herein.

FIG. 7 is a hardware diagram for an orientation-dependent device that is configured in accordance with embodiments described herein. An embodiment of FIG. 7 is depicted as an orientation-dependent device 800, which may correspond to any mobile computing device that includes roaming wireless network and/or telephony capabilities, including cellular telephony devices and/or mobile messengers.

Embodiments described herein may apply to numerous kinds of mobile or small form-factor orientation-dependent devices. One type of orientation-dependent device that may be configured to include embodiments described herein includes a computer telephony device, such as a cellular phone or mobile device with voice-telephony applications (sometimes called "smart phone"). An orientation-dependent device such as described may be small enough to fit in one hand, while providing cellular telephony features in combination with other applications, such as messaging, web browsing, media playback, personal information management (e.g. such as contact records management, calendar applications, tasks lists), image or video/media capture and other functionality. Orientation-dependent devices in particular may have numerous types of input mechanisms and user-interface features, such as keyboards or keypads, mufti-directional or navigation buttons, application or action buttons, and contact or touch-sensitive display screens. Some devices may include combinations of keyboard, button panel area, and display screen (which may optionally be contact-sensitive) on one façade. The button panel region may occupy a band between the keypad and the display area, and include a navigation button and multiple application buttons or action buttons.

Specific types of messaging that may be performed includes messaging for email applications, Short Message Service (SMS) messages, Multimedia Message Service (MMS) messages, and proprietary voice exchange applications (such as SKYPE). Still further, other types of orientation-dependent device contemplated with embodiments described herein include laptop or notebook computers, ultra-mobile computers, personal digital assistants, and other multi-functional orientation-dependent devices.

According to an embodiment, the device 800 may include one or more processors 810 (as processing resources), memory resources 815, one or more wireless communication ports 830, and various input/output features. In some embodiments, the device 800 includes a display assembly 840 having integrated sensors to detect various forms of user interaction. For example, the sensors can be resistive, capacitive or optical. Resistive sensors can be pressure sensitive to detect fingers or other objects that press on the display surface. Capacitive sensors can detect touch (or closeness) of human skin. Similarly, optical sensors can detect presence of fingers or other objects.

Numerous other input/output features and components may be included with the orientation-dependent device 800. These include a speaker 841, a microphone 844 and other input/output mechanisms 846. The display assembly 840 may be contact-sensitive (to detect presence of objects), and more specifically, touch-sensitive, to detect presence of human skin (such as the motion of a finger). According to some embodiments, the display assembly 840 provides the interface by which the user may enter input movements to interact with applications and application content.

In an embodiment, the orientation-dependent device 800 includes a magnetic element 820 for purposes of coupling and/or aligning the orientation-dependent device 800 with a detection device. The magnetic element 820 includes, for example, one or more ferrous tabs, or alternatively, magnets. In some embodiments, the magnetic element 820 may include multiple tabs, wherein at least one of the tabs is "polarized" (i.e., characteristically different than the other tabs).

The device 800 may also include orientation sensors 804 (e.g. accelerometers) to detect an orientation of the device 800 when the device is held at a sufficient angle with respect to the gravitation axis. In some embodiments, the processor 810 may orient the displays 840 to be in portrait, landscape, or other orientation, based on a detected orientation of the device 800. In addition, the processor 810 is configured to orient the display 840 based on orientation data received from a detection device.

In an alternative embodiment, the orientation-dependent device 800 may also include on-board orientation detection circuitry 808 which is configured to receive and/or process data pertaining to the relative orientation of the orientation-dependent device. The orientation detection circuitry 808 may include a set of detection circuits that align with one or more magnetic elements (e.g., tabs) in a detection device when the orientation-dependent device 800 is connected to or paired with the detection device. Accordingly, the orientation circuitry 808 may be configured to determine the relative orientation of the orientation-dependent device based on how the detection circuits are aligned with corresponding magnetic elements in the detection device. More specifically, the orientation circuitry 808 may determine the relative orientation based on the position and/or alignment of a polarization element in the detection device.

Embodiments described herein include individual elements and concepts described herein, independently of other concepts, ideas or systems, as well as combinations of elements recited anywhere in this application. Although illustrative embodiments of the invention have been described in detail with reference to the accompanying drawings, it is to be understood that the described embodiments are not limited to those precise embodiments, but rather include modifications and variations as provided. Furthermore, a particular feature described either individually or as part of an embodiment can be combined with other individually described features, or parts of other embodiments, even if the other features and embodiments make no mention of the particular feature.

What is claimed is:

1. A system comprising:
    an orientation-dependent device having multiple modes of operation, the orientation-dependent device including an arrangement of magnetic elements that are provided on a contact surface, the arrangement of magnetic elements corresponding to a tab with each tab differing in mass, the arrangement of magnetic elements including at least one magnetic element that is designated as an orientation marker;
    a detection device having a receiving surface to receive the contact surface of the orientation-dependent device and to retain the orientation-dependent device in any one of a plurality of possible orientations, the detection device including detection circuitry and logic that is configured (i) to generate a response that is sensitive to variation in mass amongst the tabs to detect individual magnetic elements that comprise the arrangement, and (ii) to determine an orientation of the orientation-dependent device based on the orientation marker; and
    wherein the detection device is structured to communicate the determined orientation to the orientation-dependent device.

2. The system of claim 1, wherein the arrangement of magnetic elements include multiple magnetic elements that have a same magnetic response, and wherein the at least one magnetic element that is designated as the orientation marker has a different magnetic response than the other magnetic elements.

3. The system of claim 2, wherein the at least one magnetic element that is designated as the orientation marker has a different shape from the other magnetic elements.

4. The system of claim 1, wherein the arrangement of magnetic elements include one or more magnetic elements that are ring-shaped.

5. The system of claim 1, wherein the detection circuitry and logic incorporate one or more coils that are each activated to be responsive to individual magnetic elements of the orientation-dependent device.

6. The system of claim 5, wherein the detection circuitry and logic detect electrical skew in an output of each of the one or more coils, the electrical skew being indicative of a relative position of the magnetic element that is designated as the orientation marker.

7. The system of claim 1, wherein when retained by the detection device, the orientation-dependent device is configured for operation in one of the multiple modes based, at least in part, on the orientation information.

8. The system of claim 1, wherein the multiple modes of operation of the orientation-dependent device include at least (i) a portrait mode, and (ii) a landscape mode.

9. The system of claim 1, wherein the detection device is structured to communicate the determined orientation to the orientation-dependent device using a wireless communication medium.

10. The system of claim 1, wherein the detection device is structured to communicate the determined orientation to the orientation-dependent device using an inductive communication medium.

11. The system of claim 1, wherein each tab is formed from a ferrous material, and wherein the detection device includes one or more magnets to magnetically couple to each tab of the orientation-dependent device.

12. The system of claim 1, further comprising at least one electrically pulsed elements that is affected by the variation in mass amongst the tabs.

13. The system of claim 12, wherein the at least one electrically pulsed elements is activated repeatedly before and after magnetic coupling is present.

14. The system of claim 1, wherein detection circuitry and logic includes a coil to generate a response that is sensitive to the variation in mass amongst the tabs.

15. The system of claim 1, wherein a difference in mass amongst the tabs correlates to an electrical characteristic identifying a position of a marker tab.

16. A device for detecting an orientation of an orientation-dependent device that is brought into contact, the device comprising:
    a receiving surface to retain the orientation-dependent device in any one of a plurality of possible orientations;
    detection circuitry and logic that is configured (i) to detect individual magnetic elements that are provided on the orientation-dependent device based on corresponding tabs each differing in mass, and (ii) to generate a response that is sensitive to variation in mass amongst the tabs and determine the orientation of the orientation-dependent device based at least in part on an orientation marker that is present in the magnetic elements provided on the orientation-dependent device.

17. The device of claim 16, wherein the detection circuitry and logic that incorporate one or more coils that are each activated to be responsive to individual magnetic elements of the orientation-dependent device.

18. The device of claim 17, wherein the detection circuitry and logic detect electrical skew in an output of each of the one or more coils, the electrical skew being indicative of a relative position of the magnetic element that is designated as the orientation marker.

19. The device of claim 16, further comprising one or more magnets to magnetically couple to each tab of the orientation-dependent device.

20. The system of claim 16, wherein the detection device is structured to communicate the determined orientation to the orientation-dependent device using a wireless communication medium.

21. The system of claim 16, wherein the detection device is structured to communicate the determined orientation to the orientation-dependent device using an inductive communication medium.

22. A system comprising:
    a orientation-dependent device having multiple orientation-dependent modes of operation; and
    a detection device having (i) a receiving surface to magnetically retain the orientation-dependent device in a plurality of orientations relative to the detection device, and (ii) circuitry to detect the relative orientation of the orientation-dependent device based on variation in mass of tabs on the orientation-dependent device and a magnetic orientation of the orientation-dependent device and the detection device.

23. The system of claim 22, wherein the multiple modes of operation include at least (i) a portrait mode, and (ii) a landscape mode.

24. The system of claim 22, wherein the detection device is configured to communicate the relative orientation to the orientation-dependent device.

* * * * *